United States Patent
Haase

(10) Patent No.: US 8,786,608 B2
(45) Date of Patent: Jul. 22, 2014

(54) SYSTEMS AND METHODS FOR PROVIDING AND USING ANIMATIONS

(75) Inventor: Chet S. Haase, Pleasanton, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1208 days.

(21) Appl. No.: 12/250,636

(22) Filed: Oct. 14, 2008

(65) Prior Publication Data

US 2013/0321430 A1    Dec. 5, 2013

(51) Int. Cl.
    *G06T 13/00*      (2011.01)
    *G09G 5/00*      (2006.01)

(52) U.S. Cl.
    USPC ............ 345/473; 345/619; 345/474; 345/475

(58) Field of Classification Search
    CPC ......... G06T 11/00; G06T 11/20; G06T 13/00; G06T 13/20; G06T 13/80; G06T 15/00; G06T 15/10
    USPC .......................................... 345/473–475, 619
See application file for complete search history.

(56) References Cited

U.S. PATENT DOCUMENTS

| | | | |
|---|---|---|---|
| 6,104,359 A * | 8/2000 | Endres et al. .................. 345/589 |
| 2008/0120626 A1 * | 5/2008 | Graffagnino et al. ......... 719/320 |
| 2009/0179901 A1 * | 7/2009 | Girard ........................... 345/474 |
| 2009/0315896 A1 * | 12/2009 | Kwiatkowski et al. ....... 345/473 |

\* cited by examiner

*Primary Examiner* — Ke Xiao
*Assistant Examiner* — Jed-Justin Imperial
(74) *Attorney, Agent, or Firm* — Kilpatrick Townsend & Stockton LLP

(57) ABSTRACT

Certain embodiments relate to combining or blending animations that are attempting to simultaneously animate the same target. Certain embodiments simplify the blending of animations in the application development environment. For example, certain embodiments allow animations to be used or specified by a developer without the developer having to specifically address the potential for time-overlapping animations. As a few specific examples, an application may specify animations by simply calling a function to change a property of a target or by sending a command to change a public property of the target. Certain embodiments provide a blender that intercepts such function calls and commands. If two animations require a change to the same target at the same time, the blender determines an appropriate blended result and sends an appropriate function call or command to the target. The function calls and commands need not be aware of the blender.

28 Claims, 5 Drawing Sheets

SYSTEMS AND METHODS FOR PROVIDING AND USING ANIMATIONS

FIELD

Embodiments of the present disclosure relate generally to computer applications and systems that create, provide, distribute, and use animated properties.

BACKGROUND

The term "animation" refers to varying over time one or more visual, numeric, or other properties, including but not limited to, location coordinates, variables, strings, and matrixes. Animation can include any time-based operation where something changes. In the computer context, an animation may be displayed on a computer screen. For example, an animation may cause an object to translate, swing, rotate or otherwise change its appearance or location on a display by changing the object's properties. One exemplary animation makes a ball appear to bounce on a computer display screen by changing the ball's position properties over time, e.g., the ball's y-coordinate position in an x,y position space varies over time. As another example, an animation may cause displayed characters or values to change on the display, e.g., "2" changes to "4" changes to "9" etc. An animation can be implemented as a single change, e.g., set the x-coordinate position of the displayed ball to 10. An animation can also be implemented as multiple changes, e.g., set the x-coordinate to 10 at time 1, set the x-coordinate to 12 at time 2, etc. In some cases, an animation can be implemented with respect to one or more changes to one or more existing values, e.g., set the x-coordinate to its current value plus 3, etc. Generally, an animation may comprise a discrete set of changes made with relative frequency to appear continuous, e.g., changing the position of a ball 24 times per second, etc.

FIG. 2a illustrates an effect 200 that causes an animation by calling a function 202 to change a target object 204. Here the function is represented as "foo(value)" with the value specified by the effect 200. The effect 200 may be something specified by an application developer in an application that will use the animation, e.g., the developer may specify that when the application is executed, the effect 200 is initiated when a button on the user interface is clicked. The effect 200 may send multiple function calls to the target 204 to cause an animation. Rather than calling a function, as shown in FIG. 2b an effect 206 may send a command 208 to set a public property "x" on the target object 210.

Two animations may attempt to vary the properties of an object within a same time period or otherwise at the same time. For instance, a first animation may attempt to move a ball up and down while a second animation attempts to move the ball back and forth, so that the ball also appears to bounce left and right at the same time the ball appears to bounce up and down. As another example, the second animation may specify a change of the ball relative to both its x-coordinate and y-coordinate, such that both the first animation and the second animation are attempting to change or set the ball's y-coordinate position property at the same time.

When animations attempt to vary properties of an object at the same time there is a potential for conflicting commands and unintended changes. One solution is to perform only one of the animations, for example, in cases where both animations attempt to start at the same time. Another solution is stop an ongoing animation whenever another animation is received for a given object or object variable. This may involve starting the second animation as if the other had come to a logical conclusion, e.g., the variable value(s) jumps to the end value(s) of the first animation and the second animation begins from that value. As a specific example, a first animation may attempt to move the ball 300 from point A 310 through a series of intermediate positions 320a-e to point B 312 as shown in FIGS. 3a-3b. However, when the ball is at position C 314, a second animation begins that attempt to move the ball up to position D. When the second animation is initiated, the first animation ends, i.e., the ball moves immediately to the end point B 312 of the first animation and the second animation proceeds from there through various intermediate points 330a-e to its final position 330f at end point D 316.

Alternatively, the first animation may stop at its current value(s) and the second animation can begin from that value. As shown in FIG. 3c, when a second animation starts, the first animation can be stopped and the current position 340a (point C 314) can be used as the starting position for the second animation. Because the first animation has been stopped, the second animation causes the ball to move in a straight line, from its current position 340a, through intermediate positions 340b-e, to its final position. Generally, these methods and techniques for dealing with multiple animations may distort the animations or cause other unintended consequences. Unfortunately, performing two or more animations simultaneously (e.g., blending animations) can be complicated and, in current animation and other types of media development, generally requires significant user/developer effort.

SUMMARY

Certain embodiments described herein provide methods and systems for combining, blending, and otherwise providing and using animations. Certain embodiments relate to combining or blending animations that are attempting to simultaneously animate the same target. Certain embodiments simplify the blending of animations in the application development environment. An application may specify animations by simply calling a function to change a property of a target or by sending a command to change a public property of the target. A blender may intercept such function calls and commands. If two animations require a change to the same target at the same time, the blender determines an appropriate blended result and sends an appropriate function call or command to the target.

One exemplary computer implemented method addresses the possibility of multiple simultaneous animations on the same properties of a target object by redirecting change requests for the target object to a second object. The method may involve receiving, at the second object, redirected change request(s) for a particular property of the target object at the same time. If there is only a single change request and thus no overlapping animation, the method may involve simply sending the single change request from the second object to the target object. However, if two or more change requests are changing the particular property of the target object at the same time, the method may involve determining a new change request using the two or more change requests, and sending the new blended or otherwise combined change request to the target object.

In other embodiments, a computer-readable medium (such as, for example, random access memory or a computer disk) comprises code for carrying out these methods.

These embodiments are mentioned not to limit or define the disclosure, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages of the present disclosure are better understood when the following Detailed Description is read with reference to the accompanying drawings, wherein.

DETAILED DESCRIPTION

The following specific illustrative embodiments are provided to illustrate some of the applications, uses, and benefits of exemplary methods and systems for combining, blending, and otherwise providing and using animations. Certain embodiments provide systems and methods for automatically handling multiple animations attempting to act on the same target object at the same time. Certain embodiments blend animations together to produce a final result that combines input animations. An application may specify animations with change requests, as examples, by simply calling a function to change a property of a target object or sending a command to change a public property of a target object. Certain embodiments provide a blender component that intercepts such function calls and commands and, if two commands change the same object at the same time, determines an appropriate blended result. The function calls, commands, or other context in which an animation is initiated need not be aware of the blender. An animation event can simply be specified in terms of the target object upon which it is acting. The blender can act as a middleman that receives some or all of the events sent to a target object and, where appropriate, combines those events for the target object.

Figure 4A:
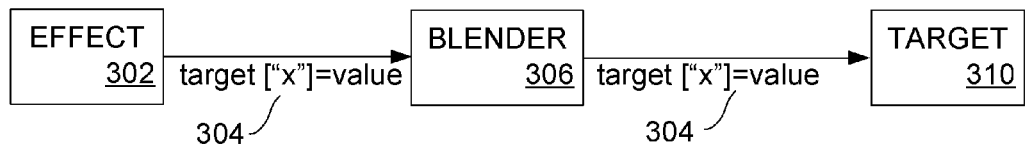
FIGS. 4a-b illustrate exemplary blenders receiving animations for a target according to certain embodiments.
Figure 4B:
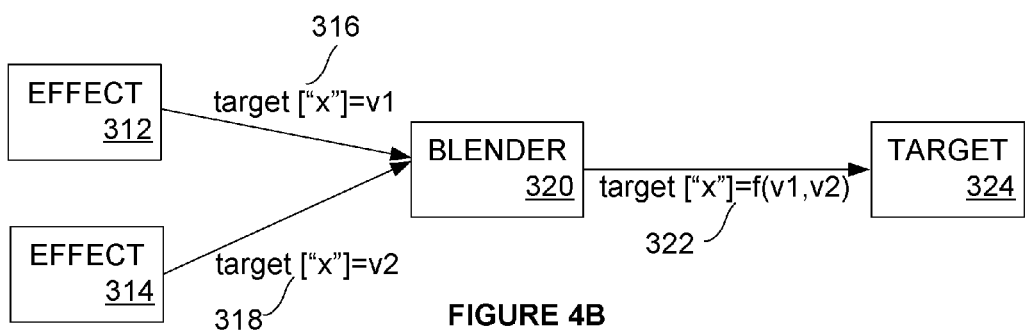

An animation may comprise a series of animation effects sending a series of commands to one or more targets. FIGS. 4a-b illustrate exemplary blenders receiving animation effects for a target. FIG. 4a shows a blender 306 intercepting command 304 from an animation effect 302 setting a new value for the "x" property of the target 310. Since there is presently no conflict, the blender 306 passes the command on to the target 310. FIG. 4b illustrates a blender 320 intercepting commands 316, 318 from two effects 312, 314, each command 316, 318 sets a different value (v1 and v2 respectively) for the "x" property of the target 310. The blender combines the commands 316, 318 and sends an appropriate command 322 to the target 324. For example, the values may be averaged, combined as a weighted average, used as inputs to a combination function, or otherwise used to determine appropriate value(s) for one or more properties of the target 324.

Figure 3A:
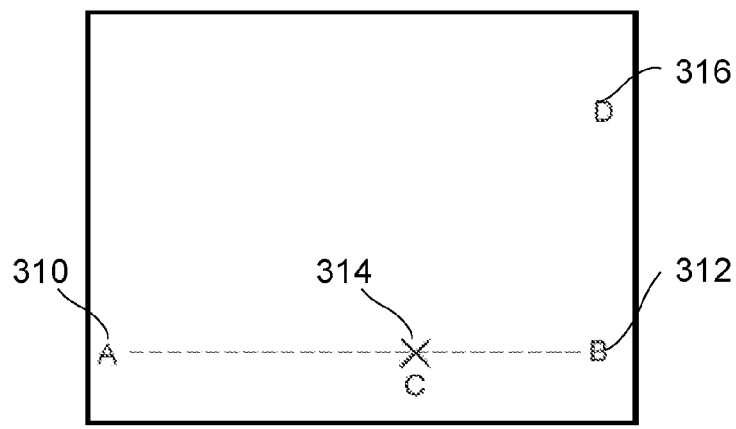
FIGS. 3a-c illustrate various prior art techniques for handling overlapping animations on the same target.
Figure 3B:
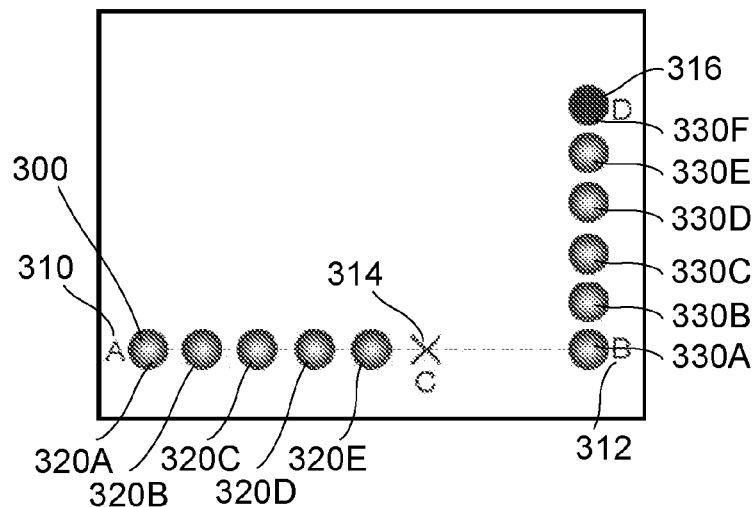
Figure 3C:
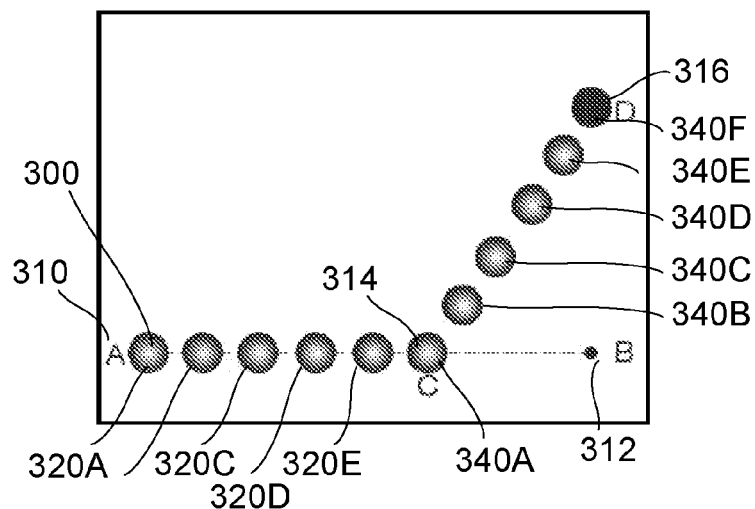
Figure 5:
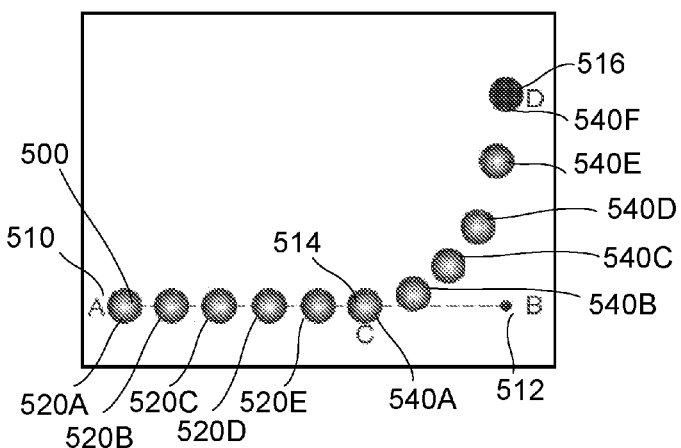
FIG. 5 illustrates blending two animations according to certain embodiments.

FIG. 5 illustrates blending of two animations according to certain embodiments. Similar to the situation depicted in FIGS. 3a-c, a first animation may attempt to move the ball 500 from position A 510 through a series of intermediate positions 520a-e, etc. to position B 512. However, when the ball 500 is at position C 514, a second animation begins that attempts to move the ball 500 up to position D 516. But instead of jumping to B 512 or starting on a linear path from position C 514, a new animation takes place which is a blend of the A-B animation and the C-D animation. The result is a curved movement of the ball 500 as the ball 500 moves from its position 540a at point C 514, through intermediate positions 540b-e, to its final position 540f at point D 516. The result can be considered a blended animation.

These illustrative examples are given to introduce the reader to the general subject matter discussed herein and are not intended to limit the scope of the disclosed concepts. The following sections describe various additional embodiments and examples of methods and systems for combining, blending, and otherwise providing and using animations.

Illustrative Authoring and Runtime Environments

Figure 1:
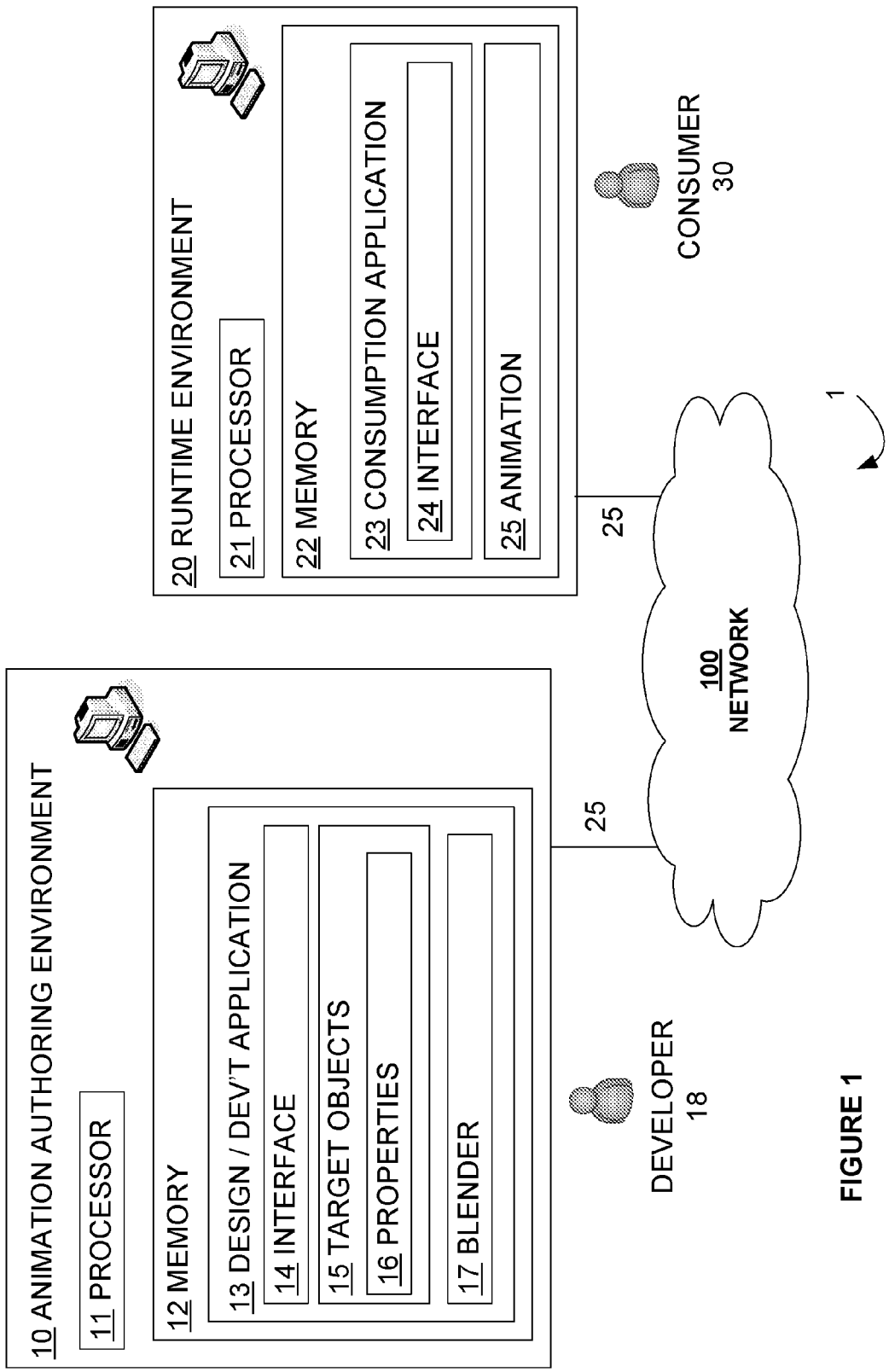
FIG. 1 is a system diagram illustrating an illustrative network environment according to certain embodiments.
Figure 2A:
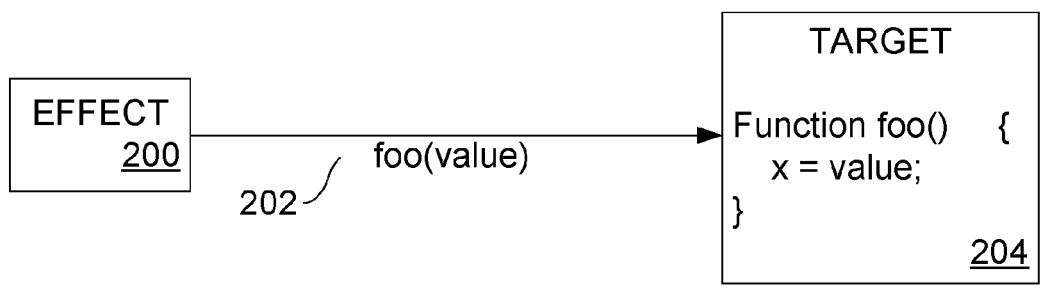
FIGS. 2a-b illustrate various prior art techniques for animating a target.
Figure 2B:
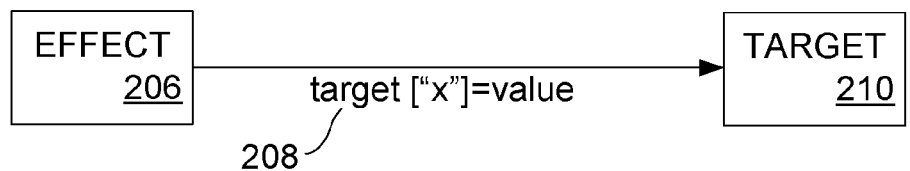

FIG. 1 is a system diagram illustrating an animation authoring environment 10 and an exemplary runtime environment 20 according to certain embodiments. Other embodiments may be utilized. The system 1 shown in FIG. 1 comprises an animation authoring environment 10, which may, for example, include a computing device that comprises a processor 11 and a memory 12. A developer 18 uses the animation authoring environment 10 to author animation and other media content. The memory 12 may comprise a design application 13 with an interface 14 that the developer 18 uses for such authoring. The interface 14 may provide a graphical design area or canvas area upon which the developer 18 may place, position, and otherwise define target objects 15 with one or more properties 16 that can be animated, for example, within a published piece of media that is being developed. Information about such target objects 15 may be stored in memory 12. An application that is being developed may define animations, as examples, with function calls to change a property 16 of a target object 15 or by sending a command to change a property 15 of the target object 15.

The design application 13 may allow the developer 18 to animate, for example, by allowing the developer 18 to animate the position properties of a graphical object displayed in an application being developed. The design application 13 also comprises a blender 17, of which a developer may or may not necessarily be aware. The blender can simplify development involving animations that have the potential to animate the same target simultaneously. A blender may be included in applications being developed such that animation-related function calls and commands directed to a target object 15 are sent first to the blender 17. If two animations require a change to the same target at the same time, the blender 17 determines an appropriate blended result and sends an appropriate function call, command, or other information to the target object.

Once the developer is ready to publish a piece of media to a runtime environment, the design application 13 generates a piece of media 25. The piece of media 25 may be used by another application on the developer's computing device or sent to another location, for example, through a network 100 to a runtime environment 20. The runtime environment may also include a processor 21 and a memory 22. The memory 22 will generally include a consumption application 23 that provides an interface 24 for viewing or otherwise consuming pieces of media. The animation 25, which may or may not be a part of a piece of media, may be stored in memory 22 and viewed or otherwise consumed by a consumer 30 using the interface 24 of the consumption application 23.

Illustrative Use of a Blender

Certain embodiments utilize a blender object that can act as an interposer, a middle man, and/or facade for one or more target objects. For example, an effect defined in terms of changes to a target object may be modified (perhaps without user knowledge) so that the effect is actually defined in terms of a blender, which can then modify and/or pass on any commands, calls, or other information it receives. For example, this redefinition may occur when an effect is initialized. When the effect is initialized the blender can send an effect modification or otherwise modify the effect so that the target object that is being acted on by the effect points to the blender instead of the original target object. For example, an effect that includes a call to change the x property of a displayed button can communicate to the blender that this call is going to be made. The blender responds with a message that indicates that the call should vary the x property on the blender instead of the x property of original target object. When the effect calls target x equals value for example, the target has actually been reset so that the blender's x value will be changed instead of the button's x value. The blender can than send a call to change the button's x value. In certain embodiments an effect can "advertise" or otherwise provide information regarding any target objects properties that it will animate so that change requests can be modified to use a blender.

A blender can thus act like a pass through filter, receiving calls, functions, and other change requests related to one or more properties of one or more target objects. The blender can track what original target objects these change requests were intended for and, in many cases, can simply pass the change requests on to the original target object. For example, an effect may tell the blender to change its x property to "10" and the blender may then tell the button to change its x property to "10." If multiple effects send change requests for the same target object at the same time, the blender can intercept these requests and send an appropriate blended request on to the target object. The blending of requests can utilize a variety of default and/or specified computational techniques. The blender can receive and pass on change requests for each increment of time, which in some cases corresponds to a single frame for displayed animation.

Certain embodiments facilitate blending of animation in ways that are transparent to a developer. In many cases, a developer can simply create/instantiate the desired effects, while the effects and blender(s) coordinate automatically to ensure that animations are blended. As a specific example, an application developer creating an application may create an effect specifying that when button A is clicked, square B will move to a new position U over the next twenty seconds. In specifying that effect, behind the scenes, the system may create a series of repositioning commands and/or repositioned values that are associated with the time intervals that occur within twenty seconds. The developer may also create a second effect specifying that when button C is clicked the same square B will move to position V over the next ten seconds. A second effect also has a series of repositioning commands generated behind the scenes. The commands created for both the first effect and the second effect are modified to point to a blender rather than square B. When the application is running, and a viewer clicks button A, square B starts to move because the blender is receiving new positions and passing them on, e.g., the blender receives one change request and passes it on, receives another an passes it on, etc. Incrementally the system is moving the target object, square B. When the viewer clicks button C and the blender starts also receiving change requests associated with the second effect at the same time it is receiving the change request for the first effect, the blender combines or otherwise uses these requests to determine a blended request that is then passed on to square B.

Combining and using change requests to determine an appropriate blended change request can involve one or more of a variety of techniques. For example, values may simply be average, e.g., set x=2 and set x=4 can be averaged to set x=3. As another example, requests can be averaged based on a priority scheme. As a specific example, if the button C effect is already running and when the button A effect is started, the button A effect may be considered the priority and an increasing amount of the proportion of the change can be taken from the commands associated button A. Other techniques for blending, combining, or otherwise using the change requests to determine a combined change request are of course possible. While the combination of change requests may be defined as default behavior, certain embodiments allow a developer to specify or otherwise customize such behavior. In some cases, a blend is based on multiple inputs, but the latest one may have priority.

Illustrative Pseudo-Code to Play an Effect

The following provides an illustrative example of pseudo-code to play an effect. A setup portion of the code performs various setup commands, a start portion of the pseudo-code causes SomeEffect to start a Tween, which uses a Timer to vary values over time and calls back into SomeEffect with the animated values, and a playing portion of the pseudo-code causes a call to set a value in the target object, e.g., target someFunction(value):

```
Setup:
    var effect:SomeEffect = new SomeEffect( );
    effect.propertyName = "someProperty";
    effect.fromValue = fromValue;
    effect.toValue = toValue;
Start:
    effect.play(someTarget);
Playing:
    onTweenUpdate(value:Object) (called by Tween
    during the animation)
```

The following is an example of how a Move effect could function:

```
Setup:
    var move:Move = new Move( );
    move.xFrom = someXValue;
    move.yFrom = someYValue;
    move.xTo = otherXValue;
    move.yTo = otherYValue;
Start:
    move.play(someTarget);
Playing:
    onTweenUpdate(value:Array)
    causes a call to a "move" function on the target:
        target.move(value[0], value[1]);
    or setting the properties directly:
        target.x = value[0];
        target.y = value[1];
```

The following is an exemplary approach for blending animations:

```
Setup:
    var effect:SomeEffect = new SomeEffect( );
    effect.someProperty = someValue;
Start:
    effect.play(someTarget);
This causes SomeEffect to call into a Blender class:
    effectManager.play(someEffect);
This, then, causes the manager to reset the target/property of the caller to
point at the Blender class instead:
    effect.target = blender;
Playing:
    onTweenUpdate(value:Array) (called by Tween during the animation)
This causes a call to set a value in the blender object, like:
    target.x = value[0];
    target.y = value[1];
But now the target has been reset to be the blender, so the above is
equivalent to calling:
    blender.x = value[0];
    blender.y = value[1];
This will be repeated for every running effect during every display frame.
Finally, when the system is ready to display that frame, the blend will
calculate final x/y values and send them into the original target:
    xBlended = blendFunc(all input x values);
    yBlended = blendFunc(all input y values);
    originalTarget.x = xBlended;
    originalTarget.y = yBlended;
```

Figure 6:
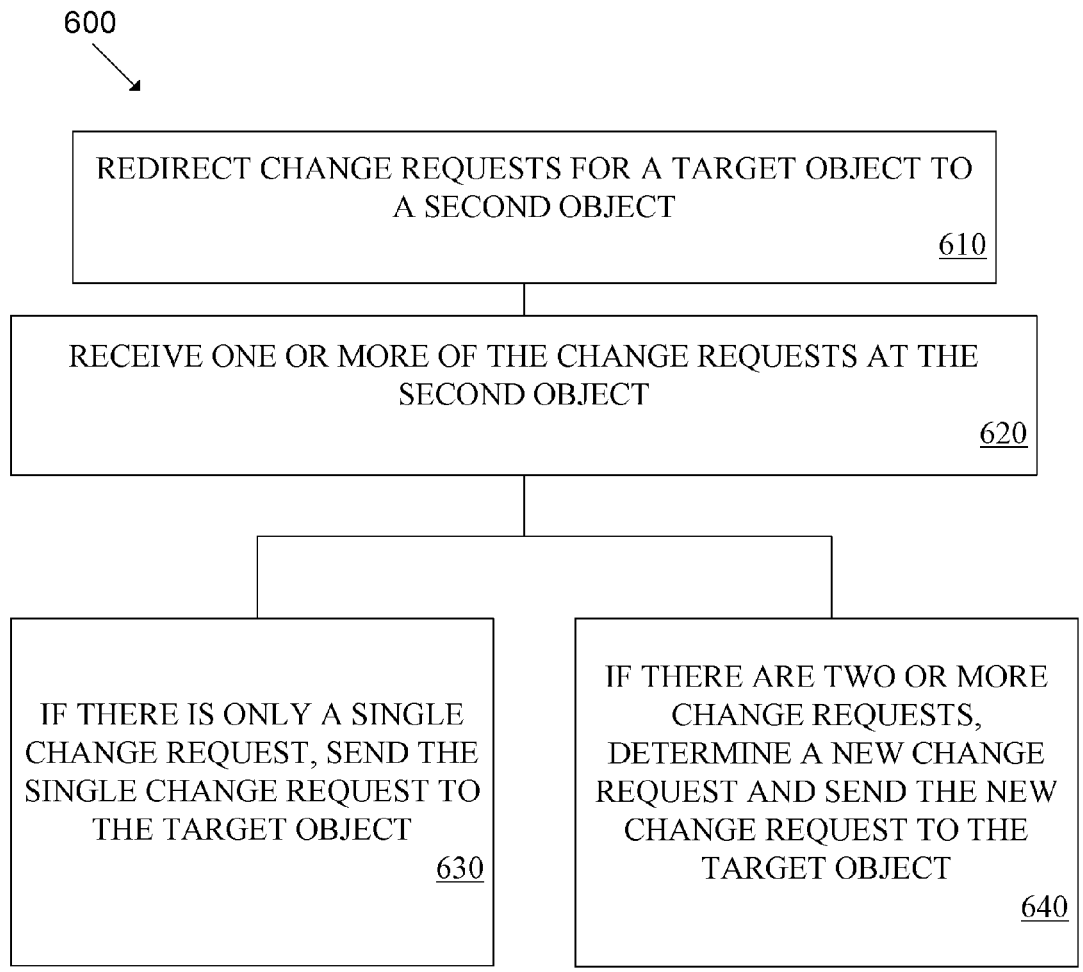
FIG. 6 is a flow chart illustrating a method of addressing simultaneous changes for a target object property according to certain embodiments.

Illustrative Method Addressing Simultaneous
Changes for a Target Object Property FIG. 6 is a flow chart illustrating a method 600 of addressing simultaneous changes for a target object property according to certain embodiments. The method 600 involves redirecting change requests for a target object to a second object, as shown in block 610. Such change requests generally request changes to one or more properties of the target object. For example, redirecting change requests may involve identifying change requests for the target object and replacing a target object identifier with a second object identifier in the change requests.

The change requests may be associated with one or more events defined for an application, such as an animation 25 developed using the design/development application 13 of FIG. 1. An event occurring in the animation application may trigger a series of change requests requesting change to one or more object properties over a time interval, each change request of the series associated with a time within the time interval. The redirecting of change requests for a target object to a second object may occur when an event is instantiated in an application such as animation application 25 of FIG. 1.

The method 600 further comprises receiving one or more of the change requests at the second object, as shown in block 620. These one or more of the change requests are for a first property of the target object at a first time, i.e., they are attempting to change the same property as the same time.

The method further involves, if a single change request at the second object is for the first property of the target object at the first time, sending the single change request from the second object to the target object, as shown in block 630.

The method further involves, if two or more change requests at the second object are for the first property of the target object at the first time, determining a new change request using the two or more change requests, and sending the new change request to the target object, as shown in block 640. If the second object is a blender object, determining the new change request using the two or more change requests may comprise blending values of the two or more change requests. Determining the new change request may involve averaging, weighted averaging, assigning weights based on request priority, or otherwise prioritizing requests, and many other techniques for combining change requests. If the property is non-numeric, determining the new change request may utilize a specific algorithm to combine the changes. For example, if the changes are colors, the algorithm may determine an appropriate blended color by examining a color space and determining an appropriate intermediate color. As another example, if the values are text strings, an algorithm might determine common elements of the text strings.

General

Certain embodiments relate to combining, blending, and otherwise providing and using animations. These are merely illustrative. In short, the techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software tools and applications that execute on each of the devices and functions performed thereon are shown in FIG. 1 as functional or storage components on the respective devices. As is known to one of skill in the art, such applications may be resident in any suitable computer-readable medium and execute on any suitable processor. For example, the devices at environments 10, 20 each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

While the network 100 shown in FIG. 1 may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs.

That which is claimed:

1. A computer implemented method comprising:
   detecting, by a processor, an event indicating an intent to modify a target object;
   in response to the detection, redirecting, by the processor, change requests for the target object to a second object by identifying the change requests for the target object and replacing a target object identifier that points to the target object with a second object identifier that points to the second object in the change requests so that change requests sent to the target object are intercepted by the second object, wherein each change request requests a change to a property of the target object at a time;
   receiving, at the second object identified by the second object identifier, one or more change requests associated with a particular property of the target object and a particular time; and
   based on determining that only a single change request at the second object is associated with the particular property of the target object and the particular time, sending, by the processor, the single change request from the second object to the target object or,
   based on determining that two or more change requests at the second object are associated with the particular property of the target object and the particular time, determining, by the processor, a new change request using the two or more change requests, and sending the new change request to the target object.

2. The computer implemented method of claim 1, wherein the second object is a blender object and determining the new change request using the two or more change requests comprises blending the two or more change requests.

3. The computer implemented method of claim 1, wherein determining the new change request using the two or more change requests comprises averaging values of the two or more change requests.

4. The computer implemented method of claim 3, wherein averaging values of the two or more change requests comprises assigning the two or more change requests equal averaging weights.

5. The computer implemented method of claim 3, wherein averaging values of the two or more change requests comprises assigning the two or more change requests unequal averaging weights.

6. The computer implemented method of claim 3, wherein averaging values of the two or more change requests comprises assigning the two or more change requests averaging weights that change depending on the time associated with each change request.

7. The computer implemented method of claim 3, wherein:
   an averaging weight associated with change requests from a first effect decrease over a time period; and
   an averaging weight associated with change requests from a second effect increase over the time period.

8. The computer implemented method of claim 3, wherein averaging values of the two or more change requests comprises averaging based on a priority scheme.

9. The computer implemented method of claim 8, wherein a change request associated with a recent event is given a higher priority than a change request associated with a less recent event.

10. The computer implemented method of claim 1, wherein the property is non-numeric.

11. The computer implemented method of claim 10, wherein determining the new change request using the two or more change requests comprises using an algorithm to combine the two or more change requests.

12. The computer implemented method of claim 1, wherein the change requests are associated with one or more events defined for an application, wherein when an event of the one or more events occurs in the application a series of change requests are created for requesting change to one or more object properties over a time interval, each change request of the series associated with a time within the time interval.

13. The computer implemented method of claim 12, wherein the change requests requesting change to the particular property of the target object at the particular time are associated with multiple events of the one or more events occurring in the application.

14. The computer implemented method of claim 12, wherein the redirecting change requests for the target object to the second object occurs when an event of the one or more events is instantiated in the application.

15. The computer implemented method of claim 1, wherein at least one of the change requests are structured as function calls.

16. The computer implemented method of claim 1, wherein at least one of the change requests are changes to public properties.

17. The computer implemented method of claim 1, further comprising:
   displaying the target object on a display of a computing device; and
   displaying a movement of the target object according to the single change request or the new change request received by the target object.

18. The computer implemented method of claim 1, wherein an individual change request of the change requests comprises a call to a function to change at least one property of the target object or a command to change at least one public property of the target object.

19. The computer implemented method of claim 1, wherein the change requests are initiated by a first component that is different than a second component, the second component being associated with the second object.

20. The computer implemented method of claim 1, wherein the change requests are received by a second component associated with the second object.

21. The computer implemented method of claim 1, wherein the detected event is specified in terms of the target object.

22. A computer implemented method comprising:
   detecting, by a processor, an event indicating an intent to modify a target object;
   in response to the detection, redirecting, by the processor, change requests for the target object to a second object by identifying the change requests for the target object and replacing a target object identifier that points to the target object with a second object identifier that points to the second object in the change requests so that change requests sent to the target object are intercepted by the second object, wherein each change request requests a change to a property of the target object at a time;

receiving, at the second object, one or more change requests associated with a particular property of the target object and a particular time; and sending, by the processor, a target object request to the target object, the target object request determined using the one or more change requests at the second object.

23. The method of claim 22, wherein:

if a single change request at the second object is associated with the particular property of the target object at the particular time, the target object request comprises the single change request; and if two or more change requests at the second object are associated with the particular property of the target object at the particular time, the target object request comprises a combined request determined using the two or more change requests.

24. The computer implemented method of claim 22, wherein the change requests are associated with one or more events defined for an application, wherein when an event of the one or more events occurs in the application a series of change requests are created for one or more object properties over a time interval, each change request of the series associated with a time within the time interval.

25. The computer implemented method of claim 24, wherein the change requests for the particular property of the target object at the particular time are associated with multiple events of the one or more events occurring in the application.

26. A system comprising:

a processor for executing instructions stored in non-transitory computer-readable medium to provide an interface for specifying events for an application, wherein when an event occurs in the application a series of change requests for a target object are created for changing one or more object properties of the target object over a time interval, each change request of the series associated with a time within the time interval;

a detection component stored in said non-transitory computer-readable medium and executable by said processor for detecting an event indicating an intent to modify the target object;

a redirecting component stored in said non-transitory computer-readable medium and executable by said processor for redirecting the series of change requests for the target object by identifying the series of change requests for the target object and replacing a target object identifier that points to the target object with a second object identifier that points to the second object in each of the series of change requests so that change requests sent to the target object are intercepted by the second object, wherein the redirection occurs in response to the detection of the event indicating the intent to modify the target object; and a blending object identified by the second object identifier, the blending object stored in said non-transitory computer-readable medium and executable by said processor for receiving change requests and sending a target object request to the target object, the target object request comprising either an unaltered change request of the series of change requests or a combined change request.

27. The system of claim 26, wherein:

the target object request comprises a single change request if only the single change request at the blending object is associated with a particular property of the target object at a particular time; and the target object request comprises a combined request determined using two or more change requests if the two or more change requests at the blending object are associated with the particular property of the target object at the particular time.

28. A non-transitory computer-readable medium on which is encoded program code, the program code, when executed by a processor, causes the processor to perform the method comprising:

detecting an event indicating an intent to modify a target object;

redirecting change requests for the target object to a second object by identifying the change requests for the target object and replacing a target object identifier that points to the target object with a second object identifier that points to the second object in the change requests so that change requests sent to the target object are intercepted by the second object, wherein the redirection occurs in response to the detection of the event, and wherein each change request requests a change to a property of the target object at a time;

receiving, at the second object identified by the second object identifier, one or more change requests associated with a particular property of the target object and a particular time; and based on determining that only a single change request at the second object is associated with the particular property of the target object and the particular time, sending the single change request from the second object to the target object, or based on determining that two or more change requests at the second object are associated with the particular property of the target object and the particular time, determining a new change request using the two or more change requests, and sending the new change request to the target object.

* * * * *